(12) United States Patent
Kondo

(10) Patent No.: US 6,891,688 B2
(45) Date of Patent: May 10, 2005

(54) DISK PROCESSING APPARATUS INCLUDING MEANS FOR PROVIDING EVALUATION RESULT OF RANKING A PLURALITY OF DISKS

(75) Inventor: Yoshiki Kondo, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 242 days.

(21) Appl. No.: 10/273,138

(22) Filed: Oct. 18, 2002

(65) Prior Publication Data

US 2003/0099051 A1 May 29, 2003

(30) Foreign Application Priority Data

Nov. 28, 2001 (JP) .................................... P2001-363170

(51) Int. Cl.$^7$ .............................................. G11B 27/36
(52) U.S. Cl. ........................ 360/31; 324/212; 369/53.1
(58) Field of Search ........................... 360/31; 324/210, 324/212, 226; 369/53.1, 53.12, 53.15, 53.16, 53.17, 53.2, 53.42

(56) References Cited

U.S. PATENT DOCUMENTS 6,204,660 B1 * 3/2001 Lee ............................. 324/212
6,344,938 B1 * 2/2002 Smith .......................... 360/25

FOREIGN PATENT DOCUMENTS

JP        11-213578        8/1999

* cited by examiner

Primary Examiner—Alan T. Faber
(74) Attorney, Agent, or Firm—Morgan Lewis & Bockius LLP

(57) ABSTRACT

The occurrence frequency of read error occurring when the data on one disk is read by a read unit is compared with that when the data on another disk is read by the read unit and the evaluation result of relatively evaluating the disks is displayed on a display section as the ranking of the disks. Therefore, the user can easily and precisely determine the disk having a good affinity for the apparatus main unit.

4 Claims, 3 Drawing Sheets

*FIG. 4A*

SET FIRST DISK

*FIG. 4B*

SET FIRST DISK
ENTER NAME OF DISK

*FIG. 4C*

ENTER NAME OF DISK
SET ANOTHER DISK
TO QUIT, OPERATE QUIT KEY

*FIG. 4D*

SET ANOTHER DISK
TO QUIT, OPERATE QUIT KEY
ENTER NAME OF DISK

*FIG. 5*

| RANK | TITLE | |
|---|---|---|
| 1 | ABC | ← ---- DISK EVALUATED IN THE PAST |
| ///// | ///// | ← ---- DISK EVALUATED THIS TIME |
| 3 | XXX | ← ---- DISK EVALUATED IN THE PAST |
| ///// | ///// | ← ---- DISK EVALUATED THIS TIME |
| 5 | PPP | ← ---- DISK EVALUATED IN THE PAST |

TO SCROLL, USE ↑↓ KEY

DISK PROCESSING APPARATUS INCLUDING MEANS FOR PROVIDING EVALUATION RESULT OF RANKING A PLURALITY OF DISKS

BACKGROUND OF THE INVENTION

1. Field of the Invention

This invention relates to a disk processing apparatus having an evaluation function of evaluating disks (media) such as a CD and a DVD.

2. Description of the Related Art

Hitherto, a disk processing apparatus for reading data recorded on a disk (medium) such as a CD or a DVD and playing back the read data has been available. A general disk processing apparatus comprises an error correction function of correcting a read error if the read error occurs when data is read from a disk.

A read error that cannot be corrected by the error correction function may occur. The data that cannot be corrected by the error correction function is replaced with predetermined data.

A read error is caused not only by the performance of a disk of a medium, but also by the performance of the disk processing apparatus main unit and the affinity between the disk and the apparatus main unit. A function of outputting (displaying) the number of times a read error has occurred for each disk is provided, whereby the user can determine a disk having a good affinity for his or her apparatus (disk whose read error has occurred a small number of times) and a disk having a poor affinity for his or her apparatus (disk whose read error has occurred a large number of times). Therefore, the user can select a disk having a good affinity for the apparatus main unit for use.

A disk processing apparatus comprising the configuration of outputting information indicating the number of times a read error has occurred is already proposed (JP-A-11-213578).

However, the apparatus disclosed in JP-A-11-213578 has the configuration of only displaying the information indicating the number of times a read error has occurred for the disk set in the main unit and informing the user of the current read error occurrence state. Therefore, the user must determine whether the disk is a disk having a good affinity for the apparatus (disk whose read error has occurred a small number of times) or a disk having a poor affinity for the apparatus (disk whose read error has occurred a large number of times) based on the judgment criterion obtained from the past experience. Thus, the user having poor past experience cannot make the appropriate determination; this is a problem.

SUMMARY OF THE INVENTION

It is therefore an object of the invention to provide a disk processing apparatus for displaying the evaluation result of relatively evaluating a plurality of disks, whereby the user can easily and precisely determine disks having a good affinity for the apparatus main unit.

To achieve the above object, a disk processing apparatus of the invention comprises the following configuration to solve the above-described problems:

(1) The disk processing apparatus comprises:
read means for reading data recorded on a disk;
control means for evaluating the disk based on a read error occurring when the data is read by the read means; and
display means for displaying the evaluation result of the disk by the control means, wherein
the control means is means for comparing the read error occurrence frequency of one disk with that of another and providing the evaluation result of ranking the disks.

(2) The disk processing apparatus comprises storage means for storing the read error occurrence frequency for each disk.

(3) The storage means is means for, for each disk evaluated by the control means, storing read error occurrence frequency about the disk and a title of the disk in association with each other.

In the configuration, the occurrence frequency of read error occurring when the data on one disk is read by the read means is compared with that when the data on another disk is read by the read means and the evaluation result of relatively evaluating the disks is displayed.

Therefore, the user can easily and precisely determine whether the disk is a disk having a good affinity for the apparatus main unit or a disk having a poor affinity for the main unit.

As an evaluation result display method, for example, ranking display of listing the names of disks, etc., in the descending or ascending order of the read error occurrence frequency is display preferable and easily understood by the user.

The name of each disk may be able to be entered by the user or the title, etc., of data recorded on each disk may be automatically related.

Further, if a storage section for storing the disk evaluation result (read error occurrence frequency) in an accumulation manner is provided, the degradation degree of the apparatus main unit can be checked. Specifically, if the disk whose evaluation value is stored in the storage section is again evaluated this time and the ranking of the disk resulting from the previous evaluation processing is roughly the same as the ranking of the disk resulting from the current evaluation processing, it can be checked that the apparatus main unit is scarcely degraded. If the ranking of the disk resulting from the current evaluation processing is largely lower than the ranking of the disk 10 resulting from the previous evaluation processing, it can be checked that the apparatus main unit is largely degraded.

Preferably, the storage section is implemented as non-volatile memory such as EEPROM from the viewpoint of data management.

BRIEF DESCRIPTION OF THE DRAWINGS

FIGS. 4A to 4D are drawings to show display screen examples on a display section of the disk processing apparatus of the embodiment of the invention; and FIG. 5 is a drawing to show a display screen example on the display section of the disk processing apparatus of the embodiment of the invention.

DETAILED DESCRIPTION OF THE PREFERRED EMBODIMENTS

A disk processing apparatus of an embodiment of the invention will be discussed.

Figure 1:
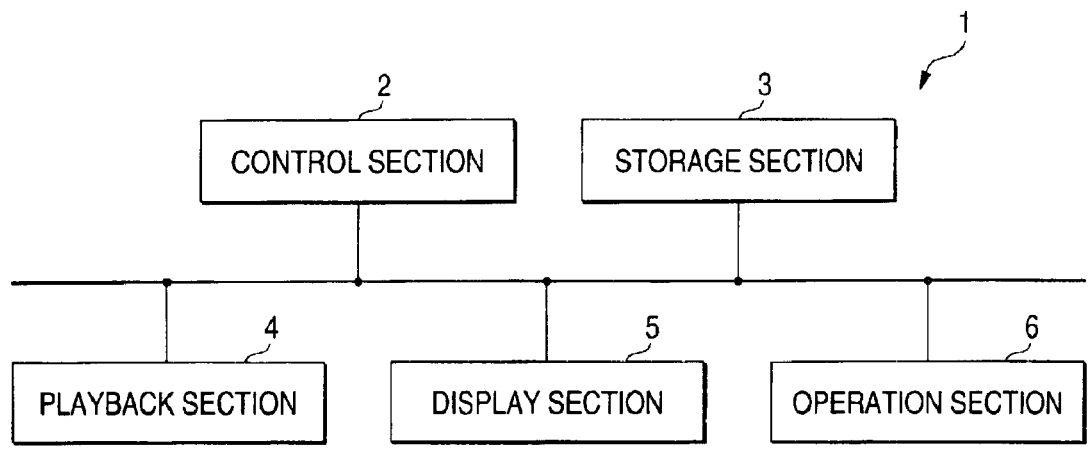
FIG. 1 is a block diagram to show the configuration of a disk processing apparatus of an embodiment of the invention.

FIG. 1 is a block diagram to show the configuration of the disk processing apparatus of the embodiment of the invention. The disk processing apparatus 1 of the embodiment comprises a control section 2 for controlling the operation of a main unit, a storage section 3 for storing the disk evaluation result in an accumulation manner for each evaluated disk, a playback section 4 for reading and playing back data recorded on a disk, a display section 5 for displaying the evaluation result, etc., and an operation section 6 for performing input operation for the main unit. The storage section 3 is EEPROM. The unnecessary disk evaluation result stored in the storage section 3 can be erased by performing predetermined key operation in the operation section 6.

Figure 2:
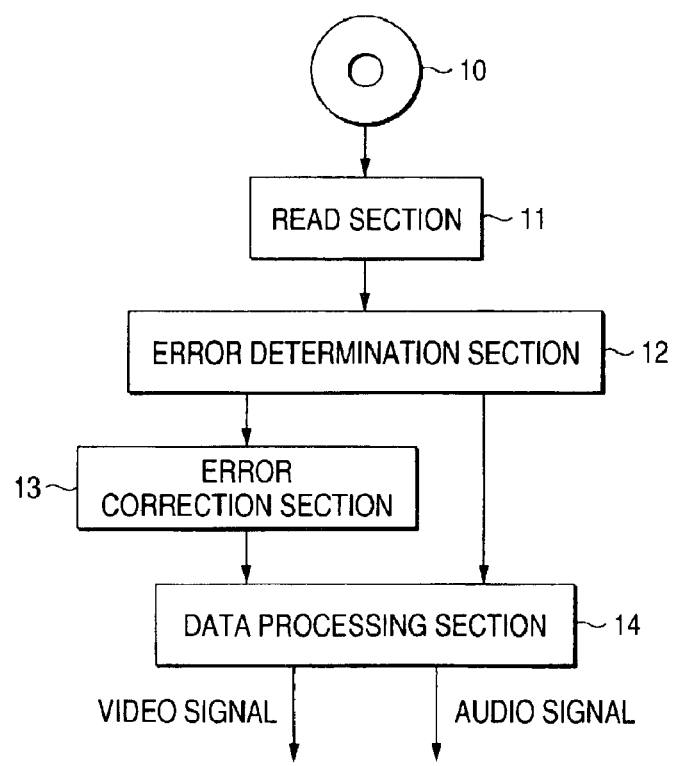
FIG. 2 is a block diagram to show the configuration of a playback section of the disk processing apparatus of the embodiment of the invention.

FIG. 2 is a block diagram to show the configuration of the playback section. The playback section 4 comprises a read section 11 for reading data recorded on a disk 10 such as a CD or a DVD, an error determination section 12 for determining whether or not a read error occurs for the data read by the read section 11, an error correction section 13 for correcting the data whose read error is determined to occur by the error determination section 12, and a data processing section 14 for decoding the data read from the disk 10 and outputting a video signal and an audio signal.

The read section 11 comprises a known pickup head. The error determination section 12 determines whether or not a read error occurs in the read section 11 and inputs the data whose read error is determined to occur to the error correction section 13 and the data whose read error is not determined to occur to the data processing section 14. The error correction section 13 corrects the input data whose read error is determined to occur. The error correction section 13 replaces the data that cannot be corrected with predetermined data for output. For example, it replaces the pixel data that cannot be corrected with predetermined pixel data for output.

The playback section 4 is also provided with a configuration for writing input data onto the disk although not shown.

The display section 5 is a liquid crystal display panel placed on the front of the apparatus main unit, etc. The evaluation result of the disk 10 is displayed on the display section 5.

The operation of the disk processing apparatus 1 of the embodiment is as follows: The disk processing apparatus 1 of the embodiment executes playback processing of outputting a video signal and an audio signal based on the data read from the disk 10 set in the main unit, write processing of writing input data onto the disk 10 set in the main unit, and evaluation processing of evaluating the disk 10. The playback processing and the write processing are known and will not be discussed again.

Figure 3:
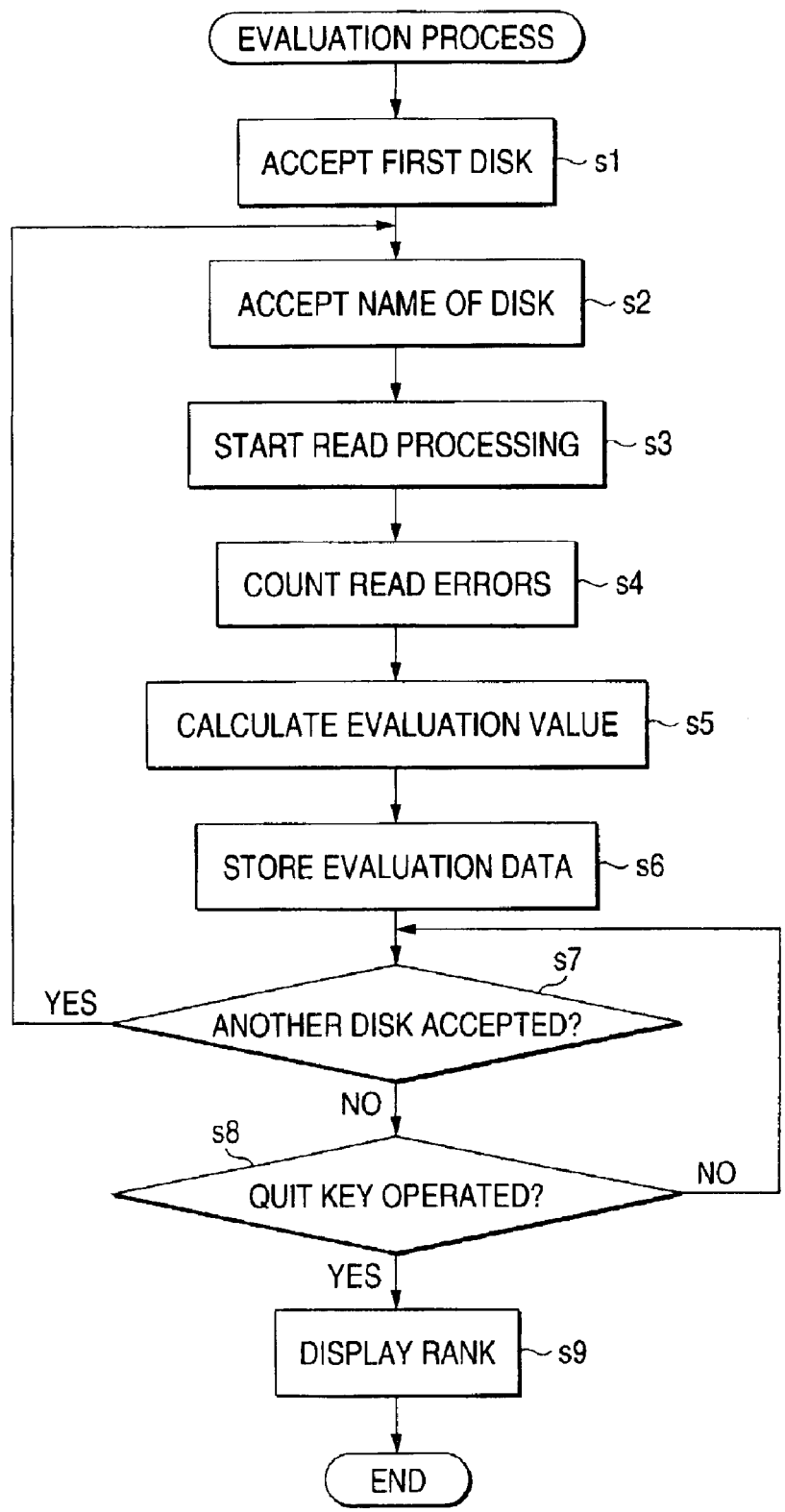
FIG. 3 is a flowchart to show evaluation processing in the disk processing apparatus of the embodiment of the invention.

FIG. 3 is a flowchart to show the evaluation processing. The evaluation processing is started by operating a specific key placed on the operation section 6. The disk processing apparatus 1 accepts the first disk 10 to be evaluated (s1). At this time, the disk processing apparatus 1 displays a message shown in FIG. 4A on the display section 5, prompting the user to set the disk 10. When accepting the disk 10 in the main unit, then the disk processing apparatus 1 accepts entry of the name (title) of the accepted disk (s2). At this time, the disk processing apparatus 1 displays a message shown in FIG. 4B on the display section 5, prompting the user to enter the name of the disk 10. The user can give any desired name to the disk 10 to be evaluated, set in the main unit.

Next, the disk processing apparatus 1 starts read processing of the data recorded on the disk 10 in the playback section 4 (s3). At s3, the data is read consecutively from the start to the termination of the data record area in the disk 10. At this time, the data whose read error is determined to occur by the error determination section 12 and input to the error correction section 13 is classified into data A that can be corrected and data B that cannot be corrected, and data A and data B are counted separately (s4).

When reading the data to the termination of the data record area in the disk 10 accepted at s1, then the disk processing apparatus 1 uses the count of data A that can be corrected and the count of data B that cannot be corrected to calculate the evaluation value of the disk 10 (s5). The evaluation value is calculated according to the following expression:

Evaluation value=(count of data A that can be corrected) X a+(count of data B that cannot be corrected) X b where a and b are constants, which are predetermined, for example, a=1 and b=2. Preferably a<b.

When calculating the evaluation value at s5, then the disk processing apparatus 1 stores the evaluation data with the count of data A that can be corrected, the count of data B that cannot be corrected, and the evaluation value calculated at s5 related to the name of the disk 10 accepted at s2 in the storage section 3 (s6).

Then, the disk processing apparatus 1 displays a message shown in FIG. 4C on the display section 5 and accepts another disk 10 (s7) or waits for the user to operate a quit key placed on the operation section 6 (s8). When accepting another disk 10, then the disk processing apparatus 1 displays a message shown in FIG. 4D on the display section 5 and repeats the process starting at s2. In contrast, if the user operates the quit key placed on the operation section 6, then the disk processing apparatus 1 displays the ranking of the disks 10 on the display section 5 based on the evaluation values of the disks 10 stored in the storage section (s9).

The storage section 3 stores not only the evaluation value of the disk 10 evaluated this time, but also the evaluation values of the disks 10 evaluated in the past, as described above.

FIG. 5 is a drawing to show a ranking display screen on the display section. The disk processing apparatus 1 determines that the disk 10 with a smaller evaluation value is the disk 10 having a better affinity for the main unit. The disk processing apparatus 1 produces ranking display of listing the names of the disks 10 in the ascending order of the evaluation values.

In the display, to distinguish between the disks 10 evaluated this time and the already evaluated disks 10 (the disks 10 whose evaluation values are already stored in the storage section 3), the disks 10 evaluated this time are reverse-displayed. The ranking of the disks 10 evaluated this time is thus displayed together with the disks 10 evaluated in the past. Therefore, the user can easily and precisely determine whether the disk 10 evaluated this time is a disk having a good affinity for the apparatus main unit or a disk having a poor affinity for the main unit.

The disks 10 not displayed on the screen may be displayed on the display section 5 by operating a scroll key placed on the operation section 6 for checking the ranking of the disks 10.

If the disk 10 whose evaluation value is stored in the storage section 3 is again evaluated this time and the ranking of the disk 10 resulting from the previous evaluation processing is roughly the same as the ranking of the disk 10 resulting from the current evaluation processing, it can be checked that the apparatus main unit is scarcely degraded. If the ranking of the disk 10 resulting from the current evaluation processing is largely lower than the ranking of the disk 10 resulting from the previous evaluation processing, it can be checked that the apparatus main unit is largely degraded.

In the embodiment, the count of data A that can be corrected, the count of data B that cannot be corrected, and the evaluation value are not displayed on the display section 5, but may be displayed.

As described above, according to the invention, the ranking of a plurality of disks is displayed, so that the user can be made to easily and precisely determine disks having a good affinity for the apparatus main unit.

The disk evaluated in the past is again evaluated, whereby the degradation degree of the apparatus main unit can be determined.

What is claimed is:

1. A disk processing apparatus comprising:

read means for reading data recorded on a disk;

control means for evaluating the disk based on a read error occurring when the data is read by said read means for each disk;

display means for displaying the evaluation result of the disk by said control means; and storage means for storing read error occurrence frequency about the disk and a title of the disk in association with each other for each disk evaluated by said control means, wherein said control means compares the read error occurrence frequency of one disk with that of another to provide the evaluation result of ranking the disks, and wherein said display means displays the disks in the ranking order.

2. A disk processing apparatus comprising:

a read unit adapted to read data recorded on a disk;

a control unit adapted to evaluate the disk based on a read error occurring when the data is read by said read unit; and a display unit adapted to display the evaluation result of the disk by said control unit, wherein said control unit compares the read error occurrence frequency of one disk with that of another to provide the evaluation result of ranking the disks.

3. The disk processing apparatus as claimed in claim 2, further comprising a storage unit for storing the read error occurrence frequency for each disk.

4. The disk processing apparatus as claimed in claim 3 wherein said storage unit stores read error occurrence frequency about the disk and a title of the disk in association with each other for each disk evaluated by said control unit.

* * * * *